G. CLAUDE.
PROCESS FOR THE SEPARATION OF OXYGEN AND NITROGEN FROM LIQUID AIR.
APPLICATION FILED DEC. 31, 1903.
950,436.
Patented Feb. 22, 1910.
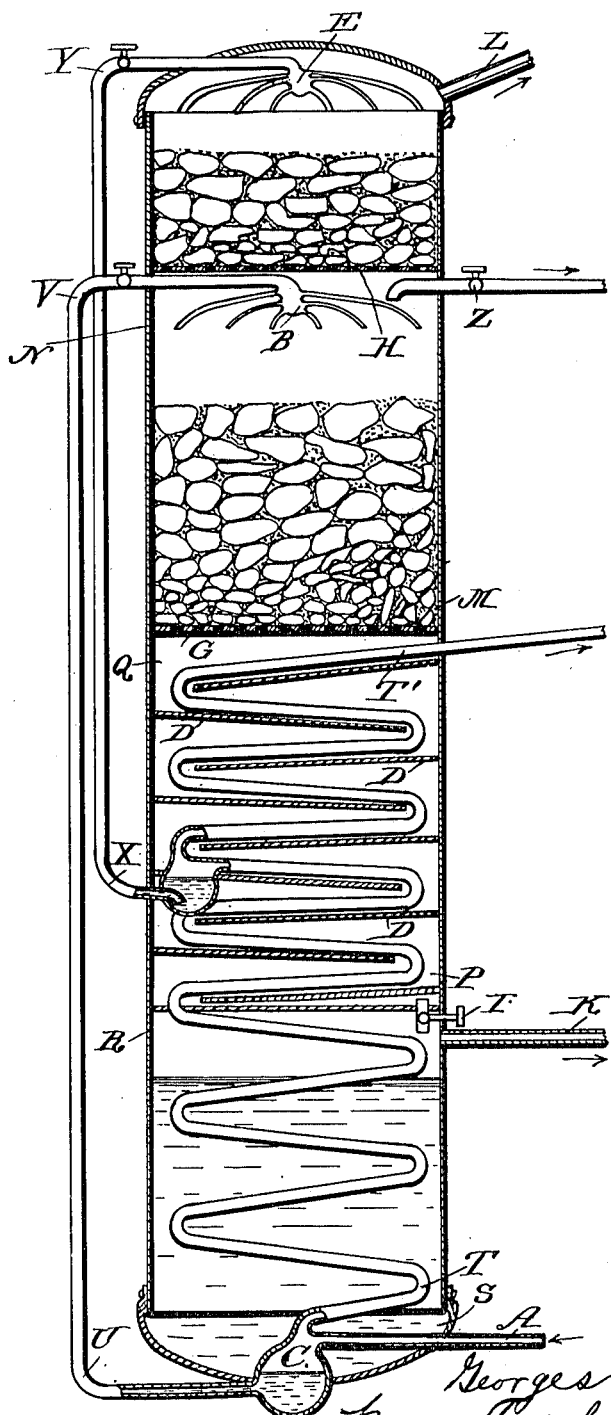

UNITED STATES PATENT OFFICE.

GEORGES CLAUDE, OF PARIS, FRANCE, ASSIGNOR TO SOCIETE L'AIR LIQUIDE, (SOCIETE ANONYME POUR L'ETUDE ET L'EXPLOITATION DES PROCEDES GEORGES CLAUDE,) OF PARIS, FRANCE.

PROCESS FOR THE SEPARATION OF OXYGEN AND NITROGEN FROM LIQUID AIR.

950,436.      Specification of Letters Patent.      Patented Feb. 22, 1910.

Application filed December 31, 1903. Serial No. 187,307.

*To all whom it may concern:*

Be it known that I, GEORGES CLAUDE, of 62 Rue St. Lazare, Paris, in the Republic of France, engineer, having invented certain new and useful Improvements in Processes for the Separation of Oxygen and Nitrogen from Liquid Air, do hereby declare that the following is a full, clear, and exact description of the same.

This invention relates to a process for the separation of atmospheric air into its two elements, by the known means of the evaporation of liquid air combined with the simultaneous liquefaction of gaseous air subjected to a slight excess of pressure as compared with the liquid air. This liquefaction and evaporation is however in this case operated under special conditions, which are followed by improved industrial advantages.

In principle my invention is based on an improved combination on the following five essential points some of which are not generally known.

1. Subjecting the air to be separated (such air having been previously purified, compressed if necessary, and cooled in a temperature exchanger according to known principles) to a partial liquefaction, causing it to circulate methodically in an opposite direction to the liquid air to be evaporated which is subjected to a less pressure. In this partial liquefaction I have found that it is more particularly the oxygen which is condensed. Owing to the methodical circulation of gases and liquids, the liquid at the higher temperature is thus reserved for liquefying the most condensable parts, while the coldest liquid acts on residues which are less and less condensable as is natural.

2. Operating this circulation of gaseous air to be treated, in an apparatus arranged, in such a way, that the liquid air formed is forced to return backward (preferably by the action of gravity) as it is condensed, that is to say is obliged to circulate, in an inverse direction and in contact with, the uncondensed air; from whence another methodical circulation is obtained having for effect to more completely exhaust, as regards oxygen, the gaseous residue, and to finally obtain in the latter the nitrogen practically pure, if the length of the condensing apparatus, the size of the contact surfaces, and the pressure are sufficient. On its side the liquid air formed becomes progressively enriched in oxygen, and when at the end of its course, near the admission of the gaseous air reaches a somewhat high percentage, which will be about 50% when the outside evaporation is operated at atmospheric pressure.

3. Discharging the liquid air of about 50% formed by this condensation, by means of its excess of pressure, at the top of a rectifying apparatus having a column filled with coke, or metallic shavings, or scrap iron, or fitted with plates resembling those of distillery columns, or the like. The liquid descends progressively in this apparatus, and reaches the first evaporating compartment. In its descent, the liquid circulates in an inverse direction to the evaporated gases constituted, as will be hereinafter stated, of a mixture somewhat rich in oxygen, and it progressively exhausts in them the oxygen, so that the evaporated gases reach a percentage as near as possible to 21% at the level of the introduction of the liquid air at 50%, while the liquid reaches the evaporating apparatus very rich in oxygen, testing for instance 80% or more.

4. Causing this rich liquid to circulate methodically in the first part of the evaporating apparatus in contact with the condensing apparatus, and in a reverse direction to the gas which is condensed inside the latter. There is thus produced a progressive evaporation which carries the final percentage of the liquid as near as may be desired to 100% of oxygen, and which at the same time progressively raises the temperature of the liquid conformably to the desideratum hereinbefore expressed. The liquid oxygen obtained is then introduced into a second evaporating compartment where, always owing to the liquefaction of the air in the condensing apparatus, the oxygen is itself evaporated and directed through the ordinary temperature exchangers to the apparatus where it is to be utilized.

5. The exhausted gas which reaches the upper part of the rectifying apparatus still contains, according to the foregoing, about 21% of oxygen, after its exhaustion by the liquid air at 50%. If it were allowed to escape in this condition it would represent a loss of oxygen of about one-third. In order to avoid this loss, I prolong the rectifying column beyond the level of introduction of the 50% liquid and cause liquid air, as poor in oxygen as possible, to reach its summit which liquid may be obtained by withdrawing directly the liquid formed in the upper part of the condensing apparatus. It must also be mentioned that by this supplementary liquefaction, the purity of the nitrogen discharged from the condensing apparatus is also increased. Under these conditions the evaporated gas itself emerges from the rectifying apparatus as pure in nitrogen as may be desired.

In order to compensate for the waste from evaporation and condensation, some liquid air is borrowed from any suitable source of liquid air, and this is introduced into the rectifying column at a height where the liquid which descends, presents a composition identical with that of the liquid added. It is possible also to operate otherwise, by compressing a little more the air to be treated and causing it to undergo, before its admission to the condensing apparatus, an expansion with external work, which would liquefy a fraction just sufficient for compensating for losses. In certain cases it may be preferable to effect this expansion after the separation. The most natural manner of operating then, consists in taking the gaseous residue not liquefied in the apparatus, and which has preserved the initial pressure of the gas treated, and sending it to effect its expansion for instance in an expansion engine.

In the accompanying drawings there is indicated one example of an apparatus for carrying my invention into practice, it being of course understood that it is in no way limited as regards the form of the apparatus, the multiplicity or nature of the contact surfaces, the nature of the materials and the like, as it is evidently possible to vary indefinitely, the practical arrangements of all kinds without departing from the essential object of the invention. It is also evident that it is unnecessary to show the apparatus for the exchange of temperatures which is constantly used in this kind of apparatus, and in which the gas to be treated, traverses in one direction so as to arrive cooled at the condensing apparatus, while the evaporated and separated gases traverse it in the other direction, so as to give up all their cold before being directed to the apparatus where they are to be utilized. In fact these temperature exchangers have nothing special in their construction in this particular instance.

In the drawings referred to the figure is a view partly in vertical section and partly in elevation of the apparatus described below.

The air to be separated enters already cold, and at the desired pressure, by A into a tubular condensing apparatus T T' which is immersed in liquid air at a less pressure and a temperature which progressively decreases from the bottom upward, as will be explained. During its ascension it undergoes a partial liquefaction, the fraction which is liquefied being in proportion to the difference of pressure, and this partial liquefaction affects first principally the oxygen, and then in proportion to the ascension of the gas in the tube T T' furnishes liquid containing less and less oxygen, while the non-condensed part is also progressively impoverished in oxygen. On its part the liquid formed, by reason of the inclination, flows back toward the bottom in a reverse direction to the gas, and is progressively enriched in oxygen until it arrives at the bottom containing a proportion approximate to 50%, while the non-condensed gas escapes at F from the condensing apparatus as pure in nitrogen as can be desired. In this circulation of the liquid and of the gas in the pipe T T', the contacts may also be assisted by various devices.

The liquid formed in the pipe T T' is collected in a vessel C, from whence by reason of the pressure it is discharged by a pipe U V at B toward the top of the rectifier M N which is traversed from below upward by the evaporated gases as will be shown. This apparatus M N is filled with coke, or scrap iron or provided with any other arrangement furnishing a large surface of contact between the descending liquid and the rising gas. During its ascent the evaporated gas becomes exhausted of oxygen by contact with the liquid and when it reaches the level B only contains about 21% of oxygen. On its part the liquid reaches the bottom of the vessel N M, very rich in oxygen, testing for instance 80%. The enriched liquid air then falls through a grating G on to a series of inclined tables in the first part P Q of the evaporating apparatus, and during its descent remains in permanent contact with the condensing pipes T T'. This produces a rapid evaporation of the descending liquid which is progressively enriched, and reaches the bottom of the last table with an oxygen content as near as may be desired to 100%, say for instance 95%. At the same time its temperature rises progressively, which enables the liquefaction in T T' to take place under the conditions hereinbefore indicated. When the liquid oxygen has reached the bottom of the vessel P Q in an approximately pure condition, it penetrates into the second evaporating compartment R S by a tap I, owing to the lower pressure which is maintained in the compartment R S. There it is vaporized in its turn and discharged to the outside through a pipe K.

I may here point out that in order to insure a liquefaction taking place under good conditions in the pipe T T', the temperature of the external liquid must increase progressively from the top to the bottom. If this condition however is easily realized for the part of the pipe T T' comprised in the chamber P Q, since the liquid which leaves this part is more charged with oxygen the lower it descends, it is more difficult to fulfil for the part R S, as a homogeneous liquid which is almost pure oxygen is contained therein. It is done however, by leaving all the liquid air in this compartment in a single mass, and thus constituting a single liquid column, which may be of sufficient height, that the compression supported by the liquid of the lower layers, causes a notable rise in the ebullition temperature of these layers.

It is known that a liquid when evaporating is colder than when not evaporating. It will, therefore, be understood that since the ebullition temperature of a liquid is dependent on the pressure, and since the lower layers of the liquid in the vessel R. S. are under the pressure due to the weight of the supernatant layers, the lower layers will not tend to evaporate as compared with the upper layers, and the latter will, therefore, be proportionately cooler than the lower layers owing to their greater rate of evaporation. In the part P. Q. there is also a gradually increasing temperature in passing from the top to the bottom owing to the fact that the lower the liquid descends, the richer it is in oxygen, which as is known has a higher boiling point than nitrogen. Hence the tube T T' is in contact with a liquid which is different in temperature at different parts, being lower in temperature the higher it is in respect of location relative to the tube T T'. Thus while on the one hand a considerable fraction of the nitrogen of the air treated, emerges from the upper part of the pipe T T' practically pure, and without having been liquefied, on the other hand almost equally pure oxygen is discharged by the pipe K. The degree of purity of the products also depends on the size of the surfaces, the differences of pressure, the rapidity of the circulation and so-forth. The only fraction of the air treated which escapes separation, is the product of the evaporation in P Q, containing about 21% of oxygen which reaches the level B, where the liquid is introduced at 50%. If this gas be allowed to escape thus, it represents a loss of about one-third of the oxygen and nitrogen contained in the air treated. In order to avoid this loss I prolong the rectifying column M N above the point B, and into the upper part at the point E, I cause to enter the liquid which is less rich in oxygen than the one which is discharged at B. I preferably discharge the nitrogen almost pure, which if the excess of pressure in the pipe T T' is sufficiently great, is condensed toward the upper part of T T' and collected by a collector O from whence a pipe X Y discharges it at E, under the action of the difference of pressure. Under these conditions the products of evaporation arriving finally in contact with liquid nitrogen, are freed progressively from their oxygen, and it is almost all pure nitrogen which is discharged by the pipe L, so that at the cost of a slight increase in the difference of pressure necessary for liquefying a notable fraction of pure nitrogen the separation of the air treated may be as complete as is desired. This additional arrangement however may be dispensed with if it be preferred to rest content with the already excellent separation obtained without it. Naturally if it be employed, it is well to arrange the discharge pipe B at the level at which the lquid discharged from E itself reaches a percentage approaching 50%.

It would be well finally to point out, that the working of the apparatus after the initial filling with liquid air, necessitates a continual feeding with some outside liquid, without which the level of the liquid in the chamber R S would constantly sink. A tap Z intended to provide the apparatus with this external liquid supply and to maintain a constant level must itself connect at a height in the column M N at which the composition of the descending liquid is exactly the same as that of the added liquid. As was hereinbefore stated however I might still compress the air to be treated a little more, and for instance, on its emerging from the temperature exchanger cause it to undergo an expansion, preferably with external work, which would liquefy a fraction of it just sufficient to compensate for the losses, and which would be added to the liquid in C.

It is quite evident that this invention may be employed for the separation of gaseous mixtures other than air.

I declare that what I claim is:—

1. A process for separating the constituents of a gaseous mixture, consisting in conducting the cold gaseous mixture under pressure into indirect contact with the more readily liquefied constituent obtained in its liquid form as a result of the process of separation and under a less pressure than that of the gaseous mixture, causing the liquefied portion of the gaseous mixture formed by the said indirect contact to travel in the opposite direction to and in direct contact with further quantities of the gases to be separated, collecting the said liquefied portion, and causing it to descend in direct contact with the ascending vapors, produced from previously descended portions by the vaporizing effect of the aforesaid indirect contact with the cold gaseous mixture.

2. A process for separating the constituents of a gaseous mixture, consisting in conducting the cold gaseous mixture under pressure into indirect contact with the liquid obtained as a result of the process of separation and under a less pressure than that of the gaseous mixture, causing the liquefied portions of the gaseous mixture formed by the said indirect contact to travel in the opposite direction to and in direct contact with further quantities of the gases to be separated, collecting the more readily liquefied portions and the less readily liquefied portions separately, causing both liquefied portions to descend, the less readily liquefied portions from a higher level than the more readily liquefied portions and in direct contact with the ascending vapors produced from previously descended portions by the vaporizing effect of the aforesaid indirect contact with the cold gaseous mixture.

3. A process for separating the constituents of a gaseous mixture, consisting in causing the gaseous mixture under pressure to travel into regions of gradually decreasing temperature causing the liquid formed by the reduction of temperature to travel in the opposite direction to and in direct contact with further quantities of the gases to be separated, collecting the aforesaid liquid, causing it to descend and ultimately come into indirect contact with the gaseous mixture that is being liquefied and become partially vaporized thereby, and causing the vaporized portions to ascend in direct contact with further quantities of the descending liquid.

4. A process for separating the constituents of a gaseous mixture, consisting in causing the gaseous mixture under pressure to travel into regions of gradually decreasing temperature causing the liquid formed by the reduction of temperature to travel in the opposite direction to and in direct contact with further quantities of the gases to be separated, collecting the more readily liquefied portions and the less readily liquefied portions separately, causing both liquefied portions to descend, the less readily liquefied portions from a higher level than the more readily liquefied portions and to ultimately come into indirect contact with the gaseous mixture that is being liquefied and become partially vaporized thereby, and causing the vaporized portions to ascend in direct contact with further quantities of the descending liquid.

5. A process for the separation of the constituents of atmospheric air, consisting in conducting the air under pressure into indirect contact with the liquid oxygen or liquid rich in oxygen resulting from the process and existing under a less pressure than the pressure of the air undergoing treatment, causing the liquid formed from the air by the said indirect contact to travel in the opposite direction to and in direct contact with further quantities of the gases to be separated, collecting the said liquid, and causing it to descend in direct contact with the vapors produced from previously descended portions.

6. A process for the separation of the constituents of air, consisting in causing the air under pressure to travel into regions of gradually decreasing temperature, causing the liquid formed by the reduction of temperature to travel in the opposite direction to and in direct contact with further quantities of the air to be separated, collecting the aforesaid liquid, causing it to descend and ultimately come into indirect contact with further quantities of air that is being liquefied and to become partially vaporized thereby, and causing the vaporized portions to ascend in direct contact with further quantities of the descending liquid.

7. A process for the separation of the constituents of air, consisting in causing the air under pressure to travel into regions of gradually decreasing temperature, causing the liquid formed by the reduction of temperature to travel in the opposite direction to and in direct contact with further quantities of the air to be separated, collecting the liquid rich in oxygen produced at the higher temperatures and the liquid rich in nitrogen produced at the lower temperatures separately, causing both liquefied portions to descend, the liquid rich in nitrogen from a higher level than the liquid rich in oxygen, and to ultimately come into indirect contact with further quantities of the air that is being liquefied and to become partially vaporized thereby, and causing the vaporized portions to ascend in direct contact with further quantities of the descending liquid.

In testimony that I claim the foregoing I have hereunto set my hand this 14th day of December 1903.

GEORGES CLAUDE.

Witnesses:
EMILE COUCHARD,
HERNANDO DE SOTO.